United States Patent [19]

Fischer et al.

[11] Patent Number: 4,704,507

[45] Date of Patent: Nov. 3, 1987

[54] ENCAPSULATED PRESSURIZED GAS INSULATED HIGH VOLTAGE INSTALLATION

[75] Inventors: Dietrich Fischer; Harald Kühn, both of Berlin, Fed. Rep. of Germany

[73] Assignee: Siemens Aktiengesellschaft, Berlin and Munich, Fed. Rep. of Germany

[21] Appl. No.: 859,798

[22] Filed: May 5, 1986

[30] Foreign Application Priority Data

May 8, 1985 [DE] Fed. Rep. of Germany ....... 3516925

[51] Int. Cl.$^4$ .............................................. H01H 33/60
[52] U.S. Cl. .............................. 200/148 B; 200/148 R
[58] Field of Search ........................ 200/148 B, 148 R

[56] References Cited

U.S. PATENT DOCUMENTS

| | | | |
|---|---|---|---|
| 2,013,507 | 9/1935 | Schwarz | 173/273 |
| 2,840,674 | 6/1958 | Piccione | 200/163 |
| 4,256,940 | 3/1981 | Kii | 200/148 |
| 4,286,128 | 8/1981 | Ruffieux et al. | 200/148 B |
| 4,348,565 | 9/1982 | Yeckley et al. | 200/148 R |
| 4,525,612 | 6/1985 | Kawashima | 200/148 B |

FOREIGN PATENT DOCUMENTS

| | | |
|---|---|---|
| 1137102 | 9/1962 | Fed. Rep. of Germany . |
| 2064037 | 3/1972 | Fed. Rep. of Germany . |
| 3318344 | 12/1983 | Fed. Rep. of Germany . |
| 2105721 | 4/1972 | France . |

*Primary Examiner*—Robert S. Macon
*Attorney, Agent, or Firm*—Kenyon & Kenyon

[57] ABSTRACT

In order to provide in an encapsulated pressurized gas insulated high voltage installation having multiple bus bars an interruption point in line with every current carrying conductor, which can be bridged by a movable conductor part and which forms a gap in a first end position of this conductor part, both conductor ends are surrounded by a shield which defines the gap. The movable conductor part rests in a second end position against an insulating sleeve and is brought through an insulating bearing ring. In the first end position, the movable conductor part is contained in a recess in an end of one of the conductor parts. The movable conductor part has an engagement surface for allowing a tool to grasp the movable conductor part to move it so as to bridge the gap.

5 Claims, 3 Drawing Figures

U.S. Patent   Nov. 3, 1987   4,704,507
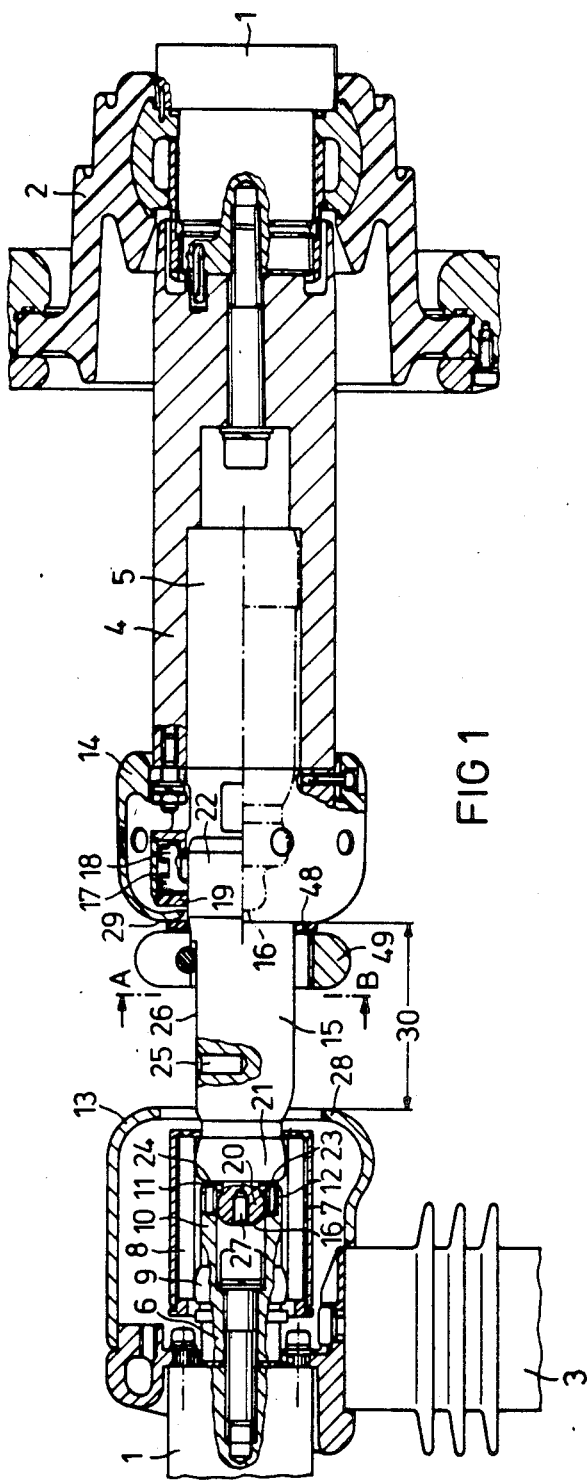
FIG 1
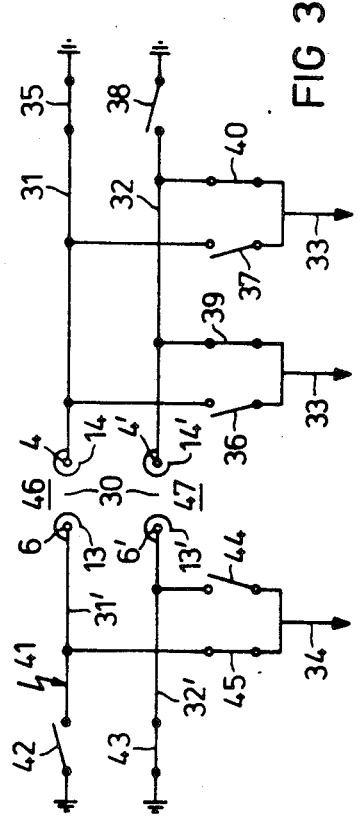
FIG 2
FIG 3

ENCAPSULATED PRESSURIZED GAS INSULATED HIGH VOLTAGE INSTALLATION

BACKGROUND OF THE INVENTION

The present invention relates to an encapsulated pressurized gas insulated high voltage installation with electric conductors, especially bus bars, which have an interruption point with two ends facing each other which can be brought into and out of engagement with each other by an axial movement of a conductor part, where the movable conductor part is held in a central recess of the one conductor end, into which it is completely inserted in a first end position, and where the other conductor end engages a hollow cylindrical coupling contact with resiliently supported current-carrying (contact) fingers, the inside diameter of which corresponds to the outside diameter of the forward contact surface of the movable conductor part which rests in its second end position against the current-carrying fingers with its forward contact surface.

Such a high voltage installation is known from DE-OS 33 18 344. In these high voltage installations it is sometimes necessary, especially for assembly or disassembly purposes, to form an interruption point in line with a current-carrying conductor, which can be cancelled, i.e., bridged. This interruption must not detract from the dielectric strength of the high voltage installation. In the known high voltage installation, the interruptions are located in the lead to the interruption units of each pole of a circuit breaker and permit a mechanical separation of the current lead from the circuit breaker pole, so that the latter can be removed for servicing and repair purposes. Since such servicing can become necessary relatively often, the removable conductor part of the interruption point can be moved, in the known high voltage installation, via a coaxial shaft provided with an external thread, where this shaft can be turned by means of miter gears and a tool introduced from the outside. This results in a relatively expensive design of the interruption point.

SUMMARY OF THE INVENTION

It is an object of the present invention to provide such an interruption point for use in line with bus bars which permits, in case of an extension of the installation, testing the dielectric strength of the new installation parts without the need of disconnecting the old parts of the installation.

To solve this problem, an encapsulated pressurized gas insulated high voltage installation of the type described above is designed, according to the invention, in such a manner that in a high voltage installation with multiple bus bars, an interruption point is arranged in every bus bar, in which both conductor ends are each surrounded by a rounded shield, the end faces of which define, in a first end position of the movable conductor part, a gap, the dielectric strength of which corresponds to the given dielectric strength of the voltage plane of the high voltage installation; that the other conductor end becomes, in the interior of the coupling contact ahead of its contact surface to the current-carrying fingers, a hollow cylinder into which, adjacent to the end face, an insulating sleeve is inserted, the inside diameter of which corresponds to the outside diameter of an extension at the end face to the movable conductor part; that in the second end position of the movable conductor part, the end face of the insulating sleeve rests on the step between the forward contact surface to the current-carrying fingers and the extension at the end face; and that the movable conductor part is provided at its end face and on its cylindrical surface with engagement surfaces for enabling the movement of the movable conductor part.

As to its mechanical design and voltage-wise, each interruption point is designed like the gap of a disconnect switch. In the first end position, i.e., with the gap open, the movable conductor part is entirely within the shield. Since in the high voltage installation with multiple bus bars such an interruption between the old and the new parts of the installation is provided in each bus bar, the old parts of the installation can continue to be operated with this end position of all movable conductor parts, if the voltage test of the new parts of the installation is carried out via another bus bar. For this purpose, the test voltage is applied to a bus bar in the new installation part, which is opposite a grounded bus bar of the old installation part. Thereby, the shield which carries test voltage can be opposite at this interruption point only to a grounded shield, as at another interruption point the shield carrying operating voltage is opposite a grounded shield. For the maximally possible voltage difference, however, the gap of every interruption point is designed with respect to its dielectric strength, since its dielectric strength corresponds to the given dielectric strength of the high voltage system.

In the second end position of the movable conductor part, the gap is bridged. Proper centralized guidance and an accurately defined end position of the movable conductor part is provided by the hollow cylinder with the insulating sleeve inserted, which provides insulated stops and guide surfaces. The current passage from the movable conductor part thereby takes place only in the region of the installation provided therefor at the current-carrying fingers. The mobility of the conductor part bridging the gap is made possible by providing on the cylinder surface, i.e., accessible from the gap or at the end face, i.e., in the first end position, engagement surfaces for a tool for moving.

It is especially advantageous if the one conductor end likewise ends in a second hollow-cylindrical coupling contact with resiliently supported contact fingers, which is located in the interior of the shield and which is closed off at the end face by an insulating bearing ring, where the inside diameter of the bearing ring corresponds to the outside diameter of the rear contact surface of the movable conductor part which comes to rest at these contact fingers in the second end position. Here, too, an unambiguously defined current passage, limited by the insulating bearing ring from the other conductor end to the rear contact surface of the movable conductor part via the contact fingers is provided which is in its second end position. Since the inside diameter of the bearing ring corresponds to the outside diameter of the rear contact surface, it serves at the same time for the centered guidance of the movable conductor part.

It is further advisable to slip a rounded clamping ring onto the conductor part thereon, as soon as it is located in the gap and to fasten it so that it has a small distance from the end face of the shield of the other conductor end and thus permits only a small movement of the movable conductor part in the axial direction, so that an undesired departure due to unexpectedly occurring shock-like stresses is prevented. If the rounded clamping ring consists of conductive material, it is advantageous to arrange between the clamping ring and the end face of the shield an insulating washer, so that undesirable passage of current to the shield is avoided.

BRIEF DESCRIPTION OF THE DRAWINGS

In the following, the invention will be explained in greater detail in the following detailed description with reference to the drawings in which:

FIG. 1 shows a longitudinal section through a bus bar conductor of an encapsulated pressurized-gas-insulated high-voltage installation, wherein the first end position of the movable conductor part is indicated dashed in the lower half;

FIG. 2 depicts a rotated cross section along the line A–B of FIG. 1; and

In FIG. 3 shows the basic block diagram of the high-voltage installation during a voltage test.

DETAILED DESCRIPTION

An encapsulated pressurized-gas-insulated high-voltage installation with a dual bus bar contains bus bar sections to carry current between switchgear panels. In these sections, the conductor 1 goes either through bushing insulators 2 of arc-proof design or is supported on support insulators 3 against the metallic, grounded tubular encapsulation, not shown, and is thereby kept at a distance from the latter.

If now in each of the two bus bars of the dual bus bar, for instance, the bushing insulator 2 is associated with an old part of the installation which is to be expanded by means of new switchgear panels, two conductor ends facing each other are provided in the conductor region to the next support insulator 3, between which an interruption point is formed which can be bridged. The one conductor end 4 is made solid, is fastened via the conductor 1 to the bushing insulator 2 and has a long centered recess 5.

The other conductor end 6 is disposed at the support insulator 3 and is fastened there to the conductor 1. The other conductor end 6 engages a hollow-symmetrical coupling contact 7 having resiliently supported contact fingers 8, and makes contact therewith via contact surface 9. In the interior of the coupling contact 7, the other conductor end 6 becomes a hollow cylinder 10, into which an insulating sleeve is inserted adjacent to the end face 11 and which protrudes beyond the latter. This entire other conductor end 6 is surrounded by a rounded shield 13 which encloses the conductor end 6 completely.

Also at the conductor end 4, a rounded shield 14 is provided which encloses all parts connected to the conductor end 4, as well as the movable conductor part 15 if the latter is in its first end position. In this first end position, the movable conductor part 15 is inserted entirely into the central recess 5 of the conductor end 4 (see the position indicated dashed in the lower half of FIG. 1) and its end face is still in the interior of the shield 14.

Conductor end 4 ends in a second hollow-cylindrical coupling contact 17 having resiliently supported contact fingers 18, which are inside the shield 14. The coupling contact 17 is closed off at the end face by an insulating bearing ring 19.

The movable conductor part 15 is provided at its end face 16 with an extension 20. The outside diameter of this extension at the end face corresponds to the inside diameter of the insulating sleeve 12 which is arranged in the hollow cylinder 10 of the other conductor part 6. Thereby, central guidance of the movable conductor part 15 in the insulating sleeve 12 is achieved, and there is no possibility of current passing there. Behind the extension 20 there is the forward contact surface 21 of the movable conductor part 15, the outside diameter of which corresponds to the inside diameter of the resiliently supported contact fingers 8 of the coupling contact 7, at which this forward contact surface 21 comes to a stop in the second end position of the movable conductor part 15.

The movable conductor part 15 has, in addition, a rear contact surface 22, the outside diameter of which corresponds to the inside diameter of the contact fingers 18 of the second coupling contact 17 and to the inside diameter of the insulating ring 19. In the second end position of the movable conductor part 15, this rear contact surface 22 rests against the contact fingers 18 and against the insulating bearing ring 19. Thereby, the current passage between the solid conductor end and the contact fingers 18 on the movable conductor part 15 is confined to an accurately defined region. Additionally, the bearing ring 19 serves for the centered guidance of the movable conductor part 15. In addition, an end face 23 of the insulating sleeve 12 comes to rest against the extension 24 between the forward contact surface 21 to the contact fingers 8 and the extension 20 at the end face, so that the second end position of the movable conductor part is unambiguously fixed also in the axial direction.

The movable conductor part 15 is further provided with a drill hole 25 on its outside surface 26 and a central tapped drill hole 27 at its end face 16. The former form engagement surfaces for receiving a tool with which the movable conductor part 15 can be moved. In the first end position of the movable conductor part 15, the hole 27 is accessible at the end face 16. The drill hole 25 on the cylinder surface 26 is arranged so that it becomes accessible before the end face 16 enters the shield.

The end face 28 of the shield 13 and the end face 29 of the shield 14 confine in the first end position of the movable conductor part 15, the gap 30, the dielectric strength of which corresponds to the given dielectric strength of the voltage plane of the high-voltage installation. In the high-voltage installation shown, a dual bus bar with the two bus bars 31 and 32 is provided, where between the old system parts 33 and the new system part 34 (see FIG. 3) an interruption point is provided in each bus bar 31, 32, the gap of which, 30, is open in the first end position of the movable conductor part 15. In order to make a voltage test in the new system part 34, the bus bar 31 is now grounded via the grounding switch 35 in the vicinity of the old system part 33. The disconnect switches 36, 37 which are connected into the branch of this bus bar and lead to the parts of the system 33 are open. In the other bus bar 32, on the other hand, the grounding switch 38 is open and the disconnect switches 39, 40 leading to the system parts 33 are closed. The old system parts 33 can therefore be operated via the bus bars 32.

The test voltage for the voltage check, indicated by the symbol 41, is now fed in the new part 34 of the installation to the bus bar 31', the grounding switch 42 of which is open. The other bus bar 32' in the new part 34 of the installation is grounded via the closed grounding switch 43. The disconnect switch 44 leading from the bus bar 32' to the new part 34 of the installation is open, while the disconnect switch 45 leading to the bus bar 31' is closed. The voltage test of the new part of the system 34 can therefore be carried out from the bus bar 31'. Opposite each other at the upper gap 46 between the bus bar 31 and the bus bar 31' are arranged at the open gap 30, the shield 13 surrounding the conductor end 6 which carries the test voltage, and the shield 14 which surrounds the conductor end 4 and is grounded. On the other hand, the lower interruption point 47 is disposed in line with the bus bar 32, 32'. With the latter, the shield 14' surrounding the conductor end 4' which carries operating voltage of the old parts 33 of the installation, is opposite the shield 13' surrounding the conductor end 6', which is grounded. Since the gap 30 of both interruption points 46, 47 corresponds to the given dielectric strength of the high-voltage installation as far as its dielectric strength is concerned, the old parts 33 of the installation which are in operation, are not endangered during the voltage test of the new parts 34 even if a breakdown should occur due to a design or assembly error at the interruption point 46, at which test voltage is present.

After the completion of such a test for dielectric strength of the new part 34 of the installation, the movable conductor part 15 is moved out of its first end position by introducing a tool into the hole 27 at the end face which is provided with a thread, and is thus introduced into the gap 30. Then, an insulating washer 48 and a rounded clamping ring 49 are slipped onto the movable conductor part 15 in such a way that the insulating washer 48 rests in the second end position of the movable conductor part on the outside against the end face 29 of the shield 14 and the clamping ring 49 is located at a small distance in front of it. Thereby, axial mobility of the movable conductor part 15 in its second end position is prevented, so that it is assured that also in the event of longitudinal displacements due to thermal expansion or shock-like stresses, the contact surfaces 22 and 21, respectively, rest against the contact fingers 18 or 8, so that the passage of the current in the regions provided therefor is assured. The rounded clamping ring 49 is secured by a screw 50 on the cylinder surface 26 of the movable conductor part 15.

In a modification of the embodiment shown, it is possible not to fasten the other conductor end directly to the support insulator, but to arrange it in front thereof in line with the bus bar. In this case, an additional shield around the conductor end alone must be provided in addition to the shielding already provided at the support insulator.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An encapsulated pressurized gas insulated high voltage installation having a plurality of electrical conductors comprising bus bars, said conductors each having an interruption point comprising first and second conductor ends facing each other which can be brought into and out of engagement with each other by an axial movement of a conductor part, said movable conductor part comprising a cylindrical member and being held in a central recess of the first of said conductor ends and being substantially completely insertable in a first end position in said recess, the second conductor end engaging a hollow cylindrical coupling contact having a plurality of resiliently supported current-carrying fingers, the inside diameter of said hollow coupling contact corresponding to the outside diameter of a forward contact surface disposed at a forward end face of the movable conductor part for providing contact with the current-carrying fingers, said forward contact surface resting in a second position against the current-carrying fingers, both of said conductor ends being surrounded by a shield, the end faces of said shields defining in the first end position of the movable conductor part a gap, the dielectric strength of the gap corresponding to the given dielectric strength of the voltage plane of the high voltage installation, said second conductor end terminating in the interior of said hollow cylindrical coupling contact to form a hollow cylinder, an insulating sleeve being inserted in said hollow cylinder adjacent an end face thereof, the inside diameter of said sleeve corresponding to the outside diameter of an extension at the end face of the movable conductor part, an end face of the insulating sleeve resting against a step formed between the forward contact surface for providing contact of the movable conductor part with the current-carrying fingers and said extension when said movable conductor part is in the second end position, the movable conductor part being provided at its end face and on the cylinder surface thereof with engagement surfaces for allowing the movable conductor part to be engaged for providing said axial movement.

2. The encapsulated pressurized gas insulated high voltage installation recited in claim 1, wherein the first conductor end terminates in a second hollow cylindrical coupling contact having a plurality of second resiliently supported contact fingers, said second coupling contact being located inside the respective shield and being closed off at an end face thereof by an insulating bearing ring, the inside diameter of the bearing ring corresponding to the outside diameter of a rear contact surface of the movable conductor part which rests against said second contact fingers in the second end position.

3. The encapsulated pressurized gas insulated high voltage installation recited in claim 1, wherein the engagement surfaces of the movable conductor part comprise hole means for receiving a tool means.

4. The encapsulated pressurized gas insulated high voltage installation recited in claim 1, further comprising a rounded clamping ring fastened to the movable conductor part when in its second end position at a small distance from the end face of the shield surrounding the first conductor end.

5. The encapsulated pressurized gas insulated high voltage installation recited in claim 4, further comprising an insulating washer arranged between the clamping ring and the end face of the shield surrounding the first conductor end.

* * * * *